2,915,250

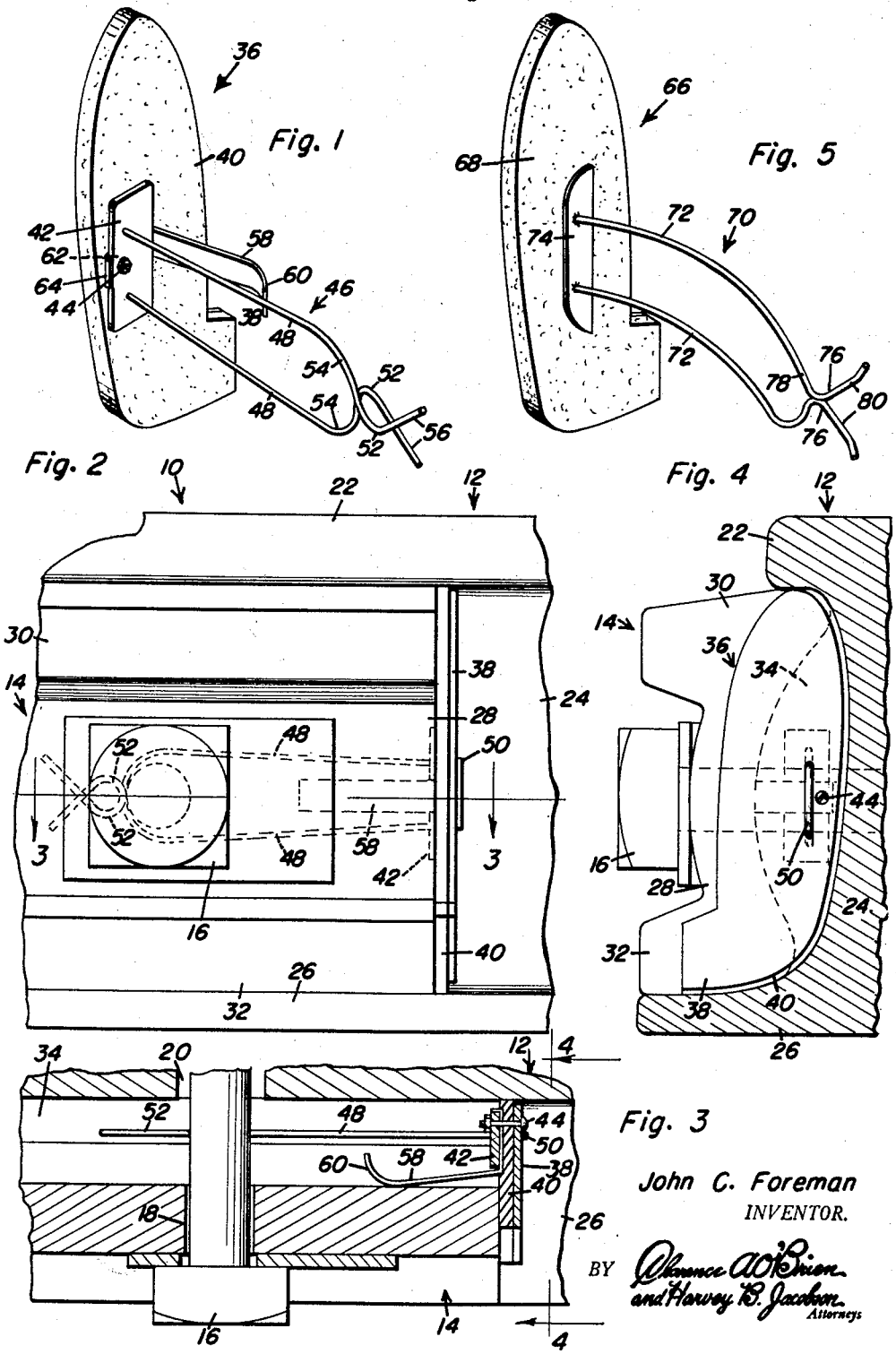

RAIL JOINT DUST CAP

John C. Foreman, Grand Island, Nebr.

Application August 21, 1957, Serial No. 679,367

3 Claims. (Cl. 238—151)

This invention relates in general to new and useful improvements in railroad rail joints, and more specifically to an improved dust cap for closing the open spaces between splice bars in railroad rails at opposite ends of the splice bars.

The individual rails of a railroad are joined together at their ends by splice bars. The splice bars are disposed on opposite sides of the rails and have flange portions which engage the base and web of the rails. However, in order to provide proper contact between the splice bars and the rails, intermediate portions of the splice bars are spaced from the rails. As a result, there is provided a space between each splice bar and the adjacent rails to which it is connected, the space being open at the opposite ends of the splice bar. The space is of such a nature whereby dust, snow and other foreign matter may enter thereinto. Also, brine drippings from refrigerator cars and the like may enter into the space. By preventing the foreign matters from entering into the space, thus, corrosion and pits in the rail and splice bar is prevented. Also, in many instances should the space become sufficiently packed, the joint between the splice bars and the rail will freeze and thus prevent movement of the rails with respect to the splice bar, which movement is necessary to compensate for the contraction and expansion of the rails due to temperature variation.

It is therefore the primary object of this invention to provide an improved dust cap for closing the space between splice bars and rails and thus prevent the entrance of foreign matter into such a space.

Another object of this invention is to provide a dust cap for closing the ends of spaces between splice bars and rails, the dust caps being of such a nature whereby they may be readily positioned and retained in place without the requirement of any special fittings on either the splice bar or the rails.

Still another object of this invention is to provide an improved dust cap for ends of splice bars, the dust cap being held against the end of the splice bar to close the space between the splice bar and the rail to which the splice bar is connected, the dust cap having a spring type fastener which engages over one of the bolts holding the splice bar to a rail.

A further object of this invention is to provide an improved dust cover for closing the space between a splice bar in a rail at the end of the splice bar, the dust cap including a cover plate which has secured thereto a resilient clip which is engageable over a bolt which in turn connects the splice bar to the rail, and a spring finger which engages the splice bar and urges an edge of the cover plate against the web of the rail to form a secure joint between the two.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear perspective view of a first form of dust cap and shows the specific details thereof including the means for mounting the dust cap with respect to a rail joint;

Figure 2 is a fragmentary side elevational view of a rail joint and shows the dust cap of Figure 1 in place at one end of a splice bar;

Figure 3 is a fragmentary sectional view taken substantially upon the plane indicated by the section line 3—3 of Figure 2 and shows further the details of the relationship between the dust cap, the splice bar, the rail and a bolt securing the splice bar to the rail;

Figure 4 is a transverse sectional view taken substantially upon the plane indicated by the section line 4—4 of Figure 3 and shows the relationship of the dust cap with respect to the web of the rail and an end of the splice bar; and Figure 5 is a perspective view of a second form of dust cap.

Referring now to the drawings in detail, it will be seen that there is illustrated in Figures 2, 3 and 4 a portion of a rail joint which is referred to in general by the reference numeral 10. The rail joint 10 will include end portions of two rails 12, although only one of the rails 12 has been shown. The rails 12 are secured to each other by means of splice bars 14. Although only one splice 14 is shown, there will be provided a splice bar 14 on each side of the rails 12. The splice bars 14 are secured in place by means of a plurality of bolts 16, only one of which has been shown. The bolt 16 passes through a transverse bore 18 in the splice bar 14 and through an elongated aperture 20 in the rail 12. The purpose of the elongated aperture 20 is to permit relative shifting of the rail 12 with respect to the splice bar 14 so that expansion and contraction of the rail 12 due to temperature variations may be compensated for.

As is best shown in Figure 4, the rail 12 includes a head 22, a web 24 and a base 26. Also, it is best shown in Figure 4 that the splice bar 14 includes an intermediate web 28, an upper flange portion 30 and lower flange portion 32. The lower flange portion 32 engages the base 26 on the upper side thereof. The upper flange 30 engages the web at the underside of the head 22. Thus there is a space 34 between a major portion of the web 24 and the web 28. It is in this space that there is a tendency for foreign matter to enter and remain thus causing pitting and corrosion of the splice bar 14 and the rail 12 and the eventual freezing of the rail joint.

Referring now to Figure 1 in particular, it will be seen that there is illustrated a dust cap which is referred to in general by the reference numeral 36. The dust cap 36, as is best shown in Figures 3 and 4, includes a backing plate 38 which corresponds generally to the space to be closed. The backing plate 38 has abutting thereagainst a cover plate 40 which is formed of rubber or other flexible material. Bearing against the side of the cover plate 40 remote from the backing plate 38 is a small plate 42 which is secured to the backing plate 38 by means of a fastener 44. The backing plate 38 is preferably secured to the cover plate 40 by means of a suitable adhesive although the fastener 44 will also facilitate the securement of the cover plate 40 to the backing plate 48.

Extending through the cover plate 40, the plate 42 and the backing plate 38 is an intermediate portion of a resilient wire clip which is referred to in general by the reference numeral 46. The clip 46 includes a pair of spaced generally parallel legs 48 which are connected together by a vertically disposed web 50. It is to be noted that the legs 48 extend through the backing plate 48 and that the web 50 bears thereagainst. The legs 48 extend a considerable distance from the cover plate 40 and terminate in crossed portions 52. The crossed portions 52 form shoulders 54 which face the cover plate 40 and terminate in diverging ends 56.

The dust cap 36 also includes a spring finger 58 which has a curved end portion 60. The spring finger 58 includes an end position 62 which is disposed between the plate 42 and the cover plate 40 and is retained in place by means of the fastener 44. The spring finger 58 terminates in a flange 64 which engages an edge of the plate 42 to prevent twisting of the spring finger 58.

When it is desired to position the dust cap 36 at one end of the splice bar 14 to close one end of the space 34, it is merely necessary to align the cover plate 40 with the end of the splice bar 14 and then to push the dust cap 36 into place. The diverging ends 56 will engage the shank of the bolt 16 and pass thereover with the shoulders 54 engaging the bolt 16 and resiliently urging the cover plate 40 into engagement with the end of the splice bar, as is best shown in Figure 2. The curved end 60 of the finger 58 will facilitate the movement of the finger 58 into the space 34. As is best shown in Figure 3, the finger 58 bears against the inner surface of the splice bar 14 and causes an edge of the cover plate 40 to bear against the upper surface of the base 26, the web 24 and the underside of the head 22. Inasmuch as this edge of the cover plate 40 corresponds in shape to the shape of the corresponding parts of the rail 12, it will be seen that a tight seal is provided between the cover plate 40 and the rail 12.

Referring now to Figure 5 in particular, it will be seen that there is illustrated a modified form of dust cap which is referred to in general by the reference numeral 66. The dust cap 66 includes a cover plate 68 which is formed of a flexible material such as rubber. Carried by the cover plate 68 is a resilient wire clip 70 which is used to retain the cover plate 68 in place. The wire clip 70 includes a pair of spaced legs 72 which have first ends thereof secured to a mounting plate 74. The mounting plate 74 is in turn secured to an inner surface of the cover plate 68. The legs 72 extend a considerable distance from the mounting plate 74 and terminate in offset end portions 76. The end portions 76 form shoulders 78 which face the cover plate 68. The end portions 76 also form diverging end parts 80.

It is to be noted that the cover plate 68 has the same outline as the cover plate 40. Thus when properly positioned, it will have an edge in engagement with the rail 12 of such a nature to provide a tight seal therewith. Also, while the design of the resilient wire clip 70 is slightly different from that of the clip 46, it will be seen that it may be easily engaged with a bolt 16 and that the shoulders 78 will engage behind the shank of the bolt 16 to resiliently retain the cover plate 68 in engagement with an end of the splice bar 14.

From the foregoing description of the dust caps 36 and 66, it will be readily apparent that there has been devised a simple, yet effective, dust cap which may be readily and quickly placed in connection with existing rail joints and new rail joints to close the ends of the spaces between the splice bars and the rails and thus prevent the entrance of foreign matter into this space. By so closing the spaces between the splice bars and the rails, and preventing the entrance of foreign matter thereinto, the freezing of the joints is eliminated and at the same time corrosion of surfaces of the rails and splice bars is prevented thus increasing the life of the rails and splice bars.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a rail joint including a pair of rail end portions, splice bars on opposite sides of said rail end portions and bolts securing said splice bars to said rail end portions, a cap for preventing foreign matter from entering into the space between the splice bars and said rail end portions, said cap including a flexible cover plate bearing against a terminal end of one of said splice bars and having an edge conforming in shape to and bearing against an intermediate part of one of said rail portions, and retaining means carried by said cover plate engaging one of said bolts intermediate said one splice bar and said one rail portion to retain said cover plate in place, said retaining means being in the form of a resilient clip having shoulders spaced from said cover plate engaging behind said one bolt, said resilient clip having diverging ends facilitating the engagement of said shoulders over said one bolt.

2. In combination with a rail joint including a pair of rail end portions, splice bars on opposite sides of said rail end portions and bolts securing said splice bars to said rail end portions, a cap for preventing foreign matter from entering into the space between the splice bars and said rail end portions, said cap including a flexible cover plate bearing against a terminal end of one of said splice bars and having an edge conforming in shape to and bearing against an intermediate part of one of said rail portions, retaining means carried by said cover plate engaging one of said bolts intermediate said one splice bar and said one rail portion to retain said cover plate in place, said retaining means being in the form of a resilient clip having shoulders spaced from said cover plate engaging behind said one bolt, said resilient clip having diverging ends facilitating the engagement of said shoulders over said one bolt, said resilient clip being under tension and retaining said cover plate in compressive face-to-face engagement with said one splice bar end.

3. In combination with a rail joint including a pair of rail end portions, splice bars on opposite sides of said rail end portions and bolts securing said splice bars to said rail end portions, a cap for preventing foreign matter from entering into the space between the splice bars and said rail end portions, said cap including a flexible cover plate bearing against a terminal end of one of said splice bars and having an edge conforming in shape to and bearing against an intermediate part of one of said rail portions, and retaining means carried by said cover plate engaging one of said bolts intermediate said one splice bar and said one rail portion to retain said cover plate in place, said retaining means being in the form of a resilient clip having shoulders spaced from said cover plate engaging behind said one bolt, said resilient clip having diverging ends facilitating the engagement of said shoulders over said one bolt, and a spring finger carried by said cover plate engaging said one splice bar and resiliently retaining said edge against said one rail portion, said spring finger having a curved end to facilitate positioning thereof, intermediate one splice bar and said one rail portion.

References Cited in the file of this patent

UNITED STATES PATENTS

| | | |
|---|---|---|
| 442,068 | Markillie | Dec. 2, 1890 |
| 603,783 | Denham | May 10, 1898 |
| 807,757 | Martin | Dec. 19, 1905 |
| 1,630,584 | Schneider | May 31, 1927 |
| 2,337,760 | McWilliams | Dec. 28, 1943 |
| 2,459,990 | Brooke | Jan. 25, 1949 |
| 2,484,449 | Fetterman | Oct. 11, 1949 |